Oct. 17, 1933.　　　　W. J. HEALY　　　　1,930,934
HEDGE TRIMMER
Filed Oct. 19, 1932　　　3 Sheets-Sheet 1
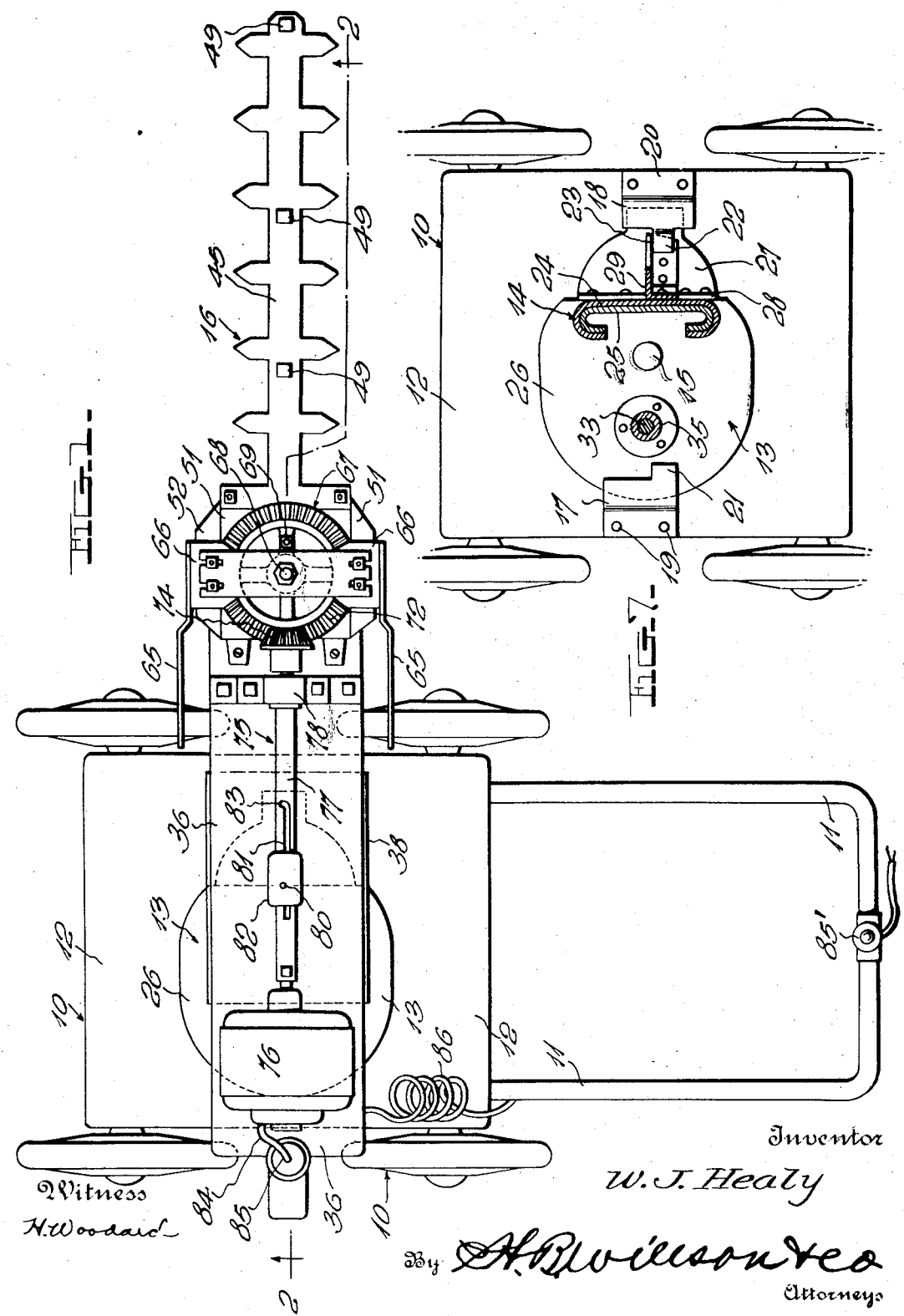
Inventor
W. J. Healy
Witness
H. Woodard Oct. 17, 1933.  W. J. HEALY  1,930,934
HEDGE TRIMMER
Filed Oct. 19, 1932  3 Sheets-Sheet 2
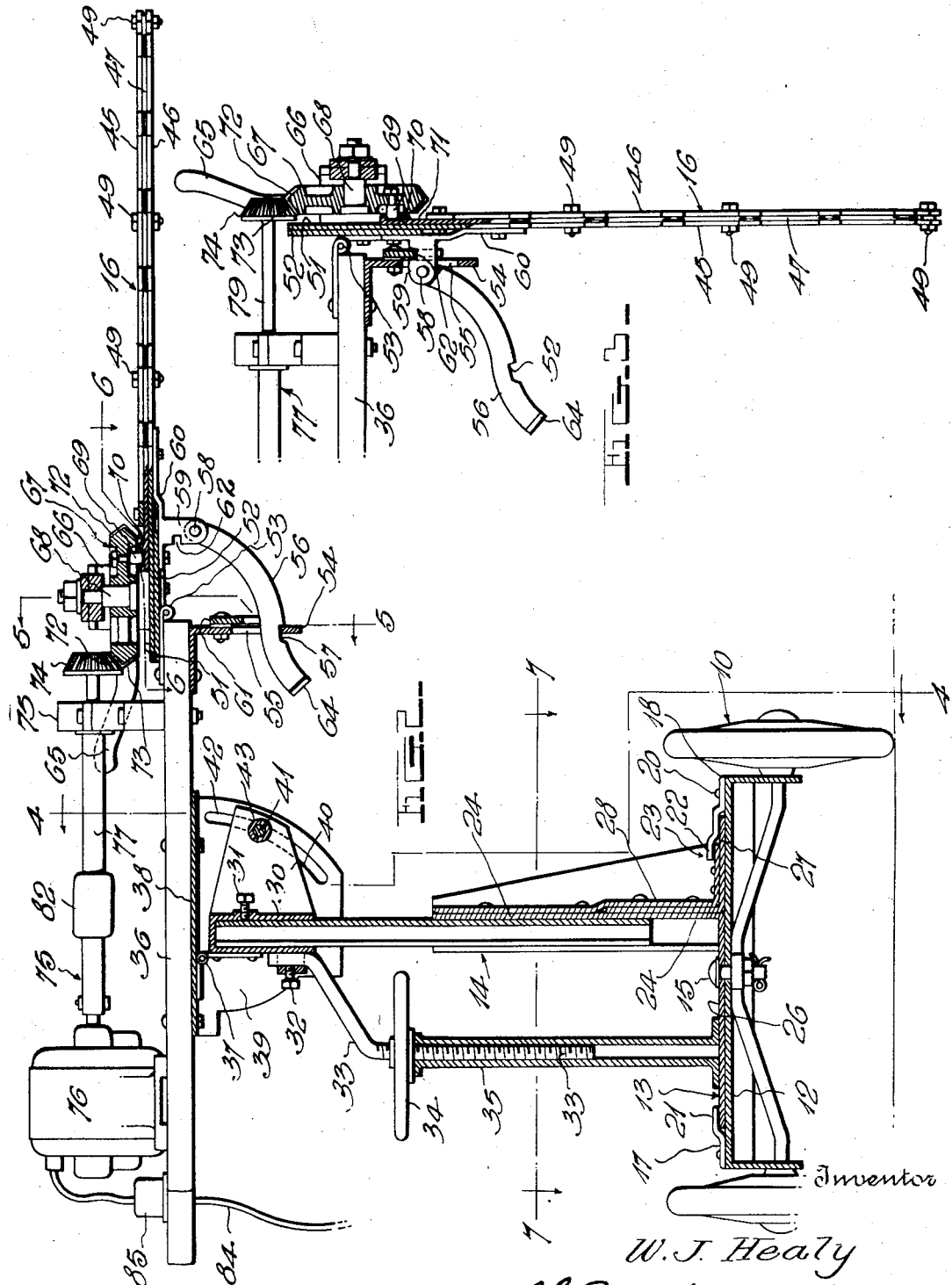
Witness
H. Woodard
Inventor
W. J. Healy
By H. B. Wilson & Co.
Attorneys

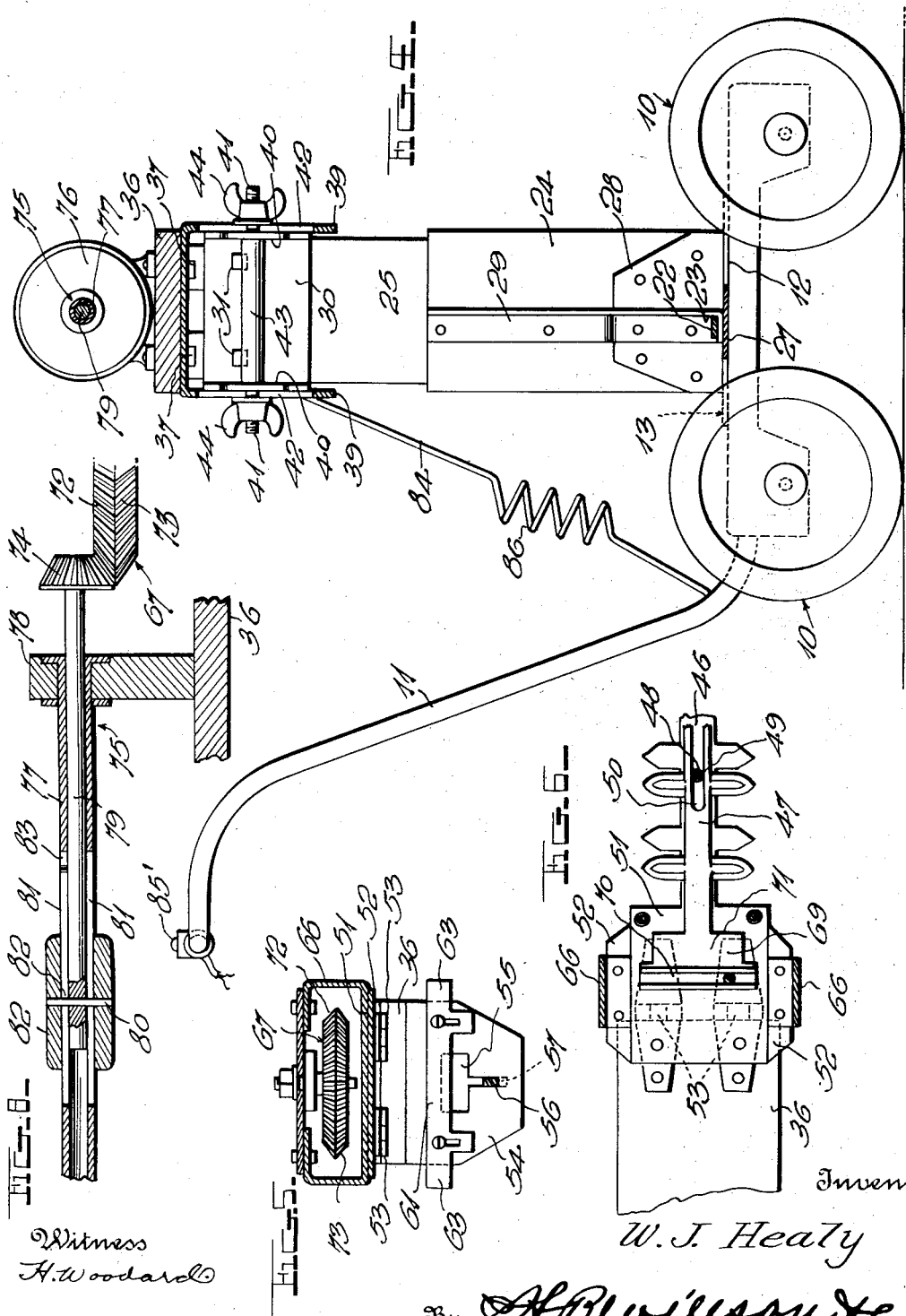

Patented Oct. 17, 1933

1,930,934

UNITED STATES PATENT OFFICE 1,930,934

HEDGE TRIMMER

William J. Healy, Rockwood, Pa.

Application October 19, 1932. Serial No. 638,630

7 Claims. (Cl. 56—237)

The invention aims primarily to provide a new and improved machine which may be moved along a hedge to accurately and rapidly trim the same.

A further object is to provide a machine including unique provision whereby a reciprocatory trimming mechanism thereof may either be positioned horizontally for trimming the top of a hedge, or vertically for trimming the sides thereof.

Another object is to provide for properly positioning the cutter mechanism with respect to the hedge, even though the ground may be inclined transversely of the hedge and the supporting truck of the machine must travel on the inclined surface.

Yet another object is to provide a simple construction permitting the trimming mechanism to be disposed at either side of the supporting truck, so that the latter may travel in either direction at either side of the hedge, when trimming the latter.

A still further object is to provide a structure which is readily adaptable to slight change to permit its use in trimming excessively high hedges.

With the foregoing and minor objects in view, the invention resides in the novel subject matter hereinafter described and claimed, description being accomplished by reference to the accompanying drawings.

Fig. 1 is a top plan view.

Fig. 2 is a vertical sectional view partly in elevation, as indicated by line 2—2 of Fig. 1, the trimming mechanism being shown in its horizontal position.

Fig. 3 is a view similar to a portion of Fig. 2 but showing the trimming mechanism swung downwardly to vertical position.

Fig. 4 is a vertical sectional view partly in elevation, as indicated by line 4—4 of Fig. 2.

Fig. 5 is a detail transverse sectional view on line 5—5 of Fig. 2.

Fig. 6 is a detail horizontal sectional view on line 6—6 of Fig. 2.

Fig. 7 is a horizontal sectional view on line 7—7 of Fig. 2.

Fig. 8 is an enlarged longitudinal sectional view through the motor-driven shaft which operates the gearing for reciprocating the sickle bar of the trimming mechanism.

The specific construction illustrated in the drawings, will be rather definitely described, with the understanding however, that within the scope of the invention as claimed, numerous variations may be made.

A wheeled truck 10 is provided having a suitable handle 11 for moving it alongside of a hedge to be trimmed, said truck having a horizontal platform 12 upon which rests the horizontal base 13 of a vertically extensible and retractible standard 14, said base being connected with said platform by means of a vertical pivot 15. The standard 14 supports the trimming mechanism 16 and its operating means, and by rotating said standard and the base 13, about the pivot 15, said trimming mechanism 16 may be disposed at either side of the truck 10. When the base 13 is in either of the positions to which it may be turned, portions of said base underlie a pair of horizontal plates 17 and 18 whose outer ends are downwardly offset and secured at 19 and 20 to the platform 12, thus assisting in stabilizing the standard and the parts carried thereby. These plates 17 and 18 are provided with stops 21 and 22 respectively, adapted to strike another stop 23 secured to the base 13.

In the construction shown, the standard 14 is formed of a lower fixed section 24 and an upper slidable section 25 telescoped therewith, the two sections being preferably of the cross-sectional shape shown in Fig. 7. The lower end of the standard section 24 is welded or otherwise secured to a horizontal plate 26 forming the major portion of the rotatable base 13, the remainder of this base being formed by a horizontal plate 27 having an upwardly projecting portion 28 secured against the outer side of the standard section 24. A suitable brace 29 is secured to the standard section 24 and to the plate 27, and a portion of this brace constitutes the stop 23 above described.

A cap 30 is removably fitted upon the upper end of the slidable standard section 25 and is secured thereto by set screws or the like 31. When this cap is removed, a longer standard section may be substituted for the section 25, adapting the machine for trimming much taller hedges. Connected with this cap, in any desired manner such as indicated at 32, is the upper end of a rod 33, said rod having threaded engagement with a hand wheel 34 resting upon a tubular standard 35 which is secured to and rises from the base 13. The parts 33, 34 and 35 constitute a jack for vertically extending the standard 14 to any desired height and for holding it at such height during hedge trimming. Also, this jack is of course usable to allow lowering of the trimming mechanism whenever required. If a standard section substituted for the section 25, be of excessive length, it will be necessary also to substitute a longer rod for the rod 33.

A substantially horizontal support 36 is hinged between its ends at 37 to the cap 30, the axis of the hinge means being horizontal. This support 36 forms a carrier for the trimming mechanism 16 and its driving means, and by swinging said support the proper extent about the hinge means 37, said trimming mechanism may also be properly positioned with respect to the hedge, whether the ground on which the truck must rest, be parallel with the top of the hedge or inclined with respect thereto. After properly adjusting the support 36, it is held by means of features of construction described below.

A horizontal plate 38 lies against the under side of the support 36 and is secured thereto, said plate being provided with parallel downwardly projecting plates 39 which straddle the cap 30. This cap is provided with two lateral arms 40 disposed in vertical planes and lying against the inner sides of the plates 39. A bolt 41 passes through the arms 40 and through arcuate slots 42 in the plates 39, said slots being concentric with the hinge means 37. A spacing sleeve 43 surrounds the bolt 41 and abuts the inner sides of the arms 40, and wing-nuts 44 are provided on the ends of said bolt. By tightening these nuts, the arms 40 and plates 39 are frictionally clamped together to hold the support 36 against accidental tilting about the hinge means 37. Loosening of one or both nuts however, allows adjustment about said hinge means.

The trimming mechanism 16 embodies upper and lower cutter bars 45 and 46 and a sickle bar 47 between said cutter bars. The upper and lower bars 45 and 46 are spaced apart by sleeves or the like 48 (see Fig. 6) and bolts 49 pass through these sleeves and through said bars, thereby rigidly securing said upper and lower bars together in spaced relation, to accommodate the sickle bar 47. This sickle bar is provided with slots 50 receiving the sleeves 48 so that the sickle bar 47 is effectively guided.

The lower cutter bar 46 is provided with an enlarged inner end 51 having secured thereto a reinforcing plate 52. This plate is connected by hinges 53 with one end of the base 36 so that the entire trimming mechanism 16 may be horizontally positioned as in Fig. 2 or vertically positioned as in Fig. 3.

A vertical bracket plate 54 is rigidly secured to the support 36 near the hinges 53, said bracket plate being provided with a substantially T-shaped slot 55. A pivoted supporting arm 56 for the trimming mechanism 16, operates in the lower end of the opening 55 and is formed with a notch 57 to engage the plate 54 when the trimming mechanism 16 is to be held in horizontal position, as seen in Fig. 2. Upon swinging of the supporting arm 56 to release its notch 57 from engagement with the plate 54, the trimming mechanism 16 may be swung downwardly to the position shown in Fig. 3.

In the construction shown, the arm 56 is pivoted at 58 to a lug 59 projecting downwardly from a plate 60 which is secured against the lower side of the plate 52 and the cutter bar 46. When the trimming mechanism 16 is downwardly swung as seen in Fig. 3, the lug 59 is receivable in the opening 55, and I provide an appropriate latch 61 slidably carried by the plate 54 and adapted to engage a notch 62 in the lug 59, for holding said trimming mechanism in its vertical position. The latch 61 is preferably provided with releasing portions 63 projecting laterally in opposite directions, and the lower end of the arm 56 is provided with similar portions 64. Thus, when the operator is standing at either side of the trimming mechanism 16, he may readily release either the arm 56 or the latch 61, with convenience.

For swinging the trimming mechanism about the hinge 53, appropriate handles 65 may well be provided. In the present disclosure, these handles are secured to opposite ends of a transverse frame 66 which is secured upon the opposite ends of the plate 52, said ends projecting laterally beyond the widened end 51 of the cutter bar 46, as seen in Figs. 1, 5 and 6. Rotatably mounted within the frame 66, is a gear 67 whose mounting means 68 is perpendicular to the trimming mechanism 16. This gear carries a stud 69 engageable with a transverse track 70 carried by the widened inner end 71 of the sickle bar 47, so that as the gear rotates, the sickle bar will be reciprocated. The gear 67 is provided with two bevels 72 and 73, either of which may engage a driving pinion 74 which is also beveled. When the trimming mechanism 16 is horizontal as in Fig. 2, the pinion 74 engages the bevel 72, but when said trimming mechanism hangs vertically as shown in Fig. 3, said pinion 74 engages the bevel 73. Pinion 74 is carried by a telescopic shaft 75 driven by an electric motor 76 mounted on the support 36.

The shaft 75 embodies a fixed tubular section 77 secured at one end to the motor shaft and rotatably mounted at its other end in an appropriate bearing 78 carried by the support 36. Slidable within the tubular section 77, is another shaft section 79 which carries the pinion 74. This shaft section 79 is provided with a transverse pin 80 slidably received in longitudinal slots 81 formed in the tubular shaft section 77. A hand grip 82 slidably surrounds this shaft section 77 and is connected with the ends of the pin 80, so that by operating said hand grip, the shaft section 79 may be slid to move the pinion 74 into and out of engagement with the gear 67. For holding the shaft 79 against accidental sliding when the pinion and gear are meshed, edges of the slots 81 are formed with notches 83 to receive the pin 80. When the trimming mechanism 16 is horizontal, the shaft section 79 is telescoped to quite an extent with the shaft section 77, but when said trimming mechanism 16 is swung downwardly as in Fig. 3, the gear 67 moves away from the pinion 74 and it is then necessary to further extend the shaft section 79 to remesh the pinion 74 with said gear 67, such sliding of the shaft section 79 being effected by the hand grip 82.

The service wires 84 for the motor 76, preferably lead to a fuse block 85 carried by the support 36 and then extend on to the motor. These wires are provided with a suitable switch 35' carried by the handle 11, and a portion of the wiring may well extend through a portion of said handle, as illustrated in Fig. 4. Another portion of the wiring may be coiled at 86 and provided with a suitable device (not shown) for holding it coiled. Thus, sufficient slack is provided to allow turning of the support 36 and connected parts about the pivot 15, without allowing the wiring to become tangled.

It will be seen from the foregoing that I have provided a rather simple and inexpensive machine which may be quickly and easily adjusted in any ways required, and may be operated to rapidly and easily trim a relatively low or a comparatively high hedge. The top of the hedge is of course trimmed with the trimming mechanism 16 held in horizontal position by the arm 56, whereas when trimming the sides of the hedge, said trimming mechanism is held vertical by the latch 61. Excessively high hedges may be trimmed by substituting a longer standard section and a longer rod, for the section 25 and rod 33, above described.

Excellent results have been obtained from the general structure shown and described, and it may therefore be followed, if desired. However, within the scope of the invention as claimed, numerous variations may be made.

I claim:—

1. A hedge trimmer comprising a truck, a base mounted thereon upon a vertical axis, a vertically extensible and retractible standard mounted on said base, a substantially horizontal support hingedly mounted on the upper end of said standard upon a horizontal axis, means for holding said base against further turning when turned to a predetermined extent, means for holding said standard in vertically adjusted position, means for holding said support when swung to desired position upon its hinged mounting, a cutter bar hinged to said support to either project horizontally or to hang vertically therefrom, means for holding said cutter bar in either position, a sickle bar slidably carried by said cutter bar, a motor mounted on said support, and means for establishing a driving connection between said motor and said sickle bar when the latter is either horizontal or vertical.

2. A hedge trimmer comprising a truck, an elevated support mounted on said truck, a cutter bar hinged to said support to either project horizontally or to hang vertically therefrom, means for holding said cutter bar in either position, a sickle bar slidably engaged with said cutter bar, a gear mounted on the hinged end of said cutter bar on an axis perpendicular thereto, means operatively connecting said gear with said sickle bar for reciprocating the latter, a motor mounted on said support, a horizontal shaft mounted on said support and driven by said motor, and a beveled pinion carried by said shaft, said gear having one bevel to engage said pinion when the cutter bar is horizontal and another bevel to engage said pinion when said cutter bar hangs vertically.

3. A hedge trimmer comprising a truck, an elevated support mounted on said truck, a cutter bar hinged to said support to either project horizontally or to hang vertically therefrom, means for holding said cutter bar in either position, a sickle bar slidably engaged with said cutter bar, a gear mounted on the hinged end of said cutter bar on an axis perpendicular thereto, means operatively connecting said gear with said sickle bar for reciprocating the latter, a motor mounted on said support, a horizontal shaft mounted on said support and driven by said motor, a beveled pinion carried by said shaft, said gear having one bevel to engage said pinion when said cutter bar is horizontal and another bevel to engage said pinion when said cutter bar hangs vertically, and means for moving said pinion into and out of engagement with said gear.

4. A hedge trimmer comprising a truck, an elevated support mounted on said truck, a cutter bar hinged to said support to either project horizontally or to hang vertically therefrom, means for holding said cutter bar in either position, a sickle bar slidably engaged with said cutter bar, a gear mounted on the hinged end of said cutter bar on an axis perpendicular thereto, means operatively connecting said gear with said sickle bar for reciprocating the latter, a motor mounted on said support, a horizontal shaft mounted on said support and driven by said motor, said shaft being formed of relatively fixed and slidable sections, a beveled pinion carried by said slidable section, the aforesaid gear having one bevel to engage said pinion when the cutter bar is horizontal, and another bevel to engage said pinion when said cutter bar hangs vertically, a hand grip slidably surrounding said fixed shaft section and connected with said slidable section for sliding the latter to move said pinion into and out of engagement with said gear, and means for holding said slidable shaft section against accidental sliding when the pinion is engaged with the gear.

5. A hedge trimmer comprising a truck, an elevated support mounted on said truck, a cutter bar hinged to said support to either project horizontally or to hang vertically therefrom, means for holding said cutter bar in either position, a sickle bar slidably engaged with said cutter bar, a gear mounted on the hinged end of said cutter bar on an axis perpendicular thereto, means operatively connecting said gear with said sickle bar for reciprocating the latter, a motor mounted on said support, a horizontal shaft mounted on said support and driven by said motor, said shaft being formed of a tubular relatively fixed section and a slidable section telescoped with said fixed section, said fixed shaft section being provided with a longitudinal slot and said slidable section having a pin slidable in said slot, a beveled pinion carried by the outer end of said slidable shaft section, said gear having one bevel to engage said pinion when the cutter bar is horizontal and another bevel to engage said pinion when said cutter bar hangs vertically, and a hand grip slidably surrounding said fixed shaft section and connected with the aforesaid pin for sliding said slidable shaft section to move said pinion into and out of engagement with said gear, a wall of the aforesaid slot being provided with notches to receive said pin and thereby hold said slidable shaft section against accidental sliding.

6. A hedge trimmer comprising a truck, a standard rising from said truck, a cap fitted removably upon the upper end of said standard, a support hinged to said cap on a horizontal axis, trimming means mounted on said support, a pair of downwardly projecting plates secured in parallel vertical planes to said support and straddling said cap, said plates having arcuate slots concentric with the hinge of said support, a pair of lateral arms rigidly carried by said cap and disposed in vertical planes against the inner sides of said plates, and means passing through said slots and engaged with said arms and plates for clamping them together to hold the support in adjusted position.

7. A hedge trimmer comprising a truck having a horizontal platform, a vertically extensible and retractible standard having a horizontal base resting on said platform, a vertical pivot connecting said base with said platform, a jack mounted on said base and connected with said standard for extending the latter, hedge trimming means mounted on said standard, and coacting stops on said platform and base for limiting the turning of the base, standard and trimming means about said pivot.

WILLIAM J. HEALY.